May 5, 1931.   N. M. SMALL   1,804,065
VALVE
Filed June 21, 1928
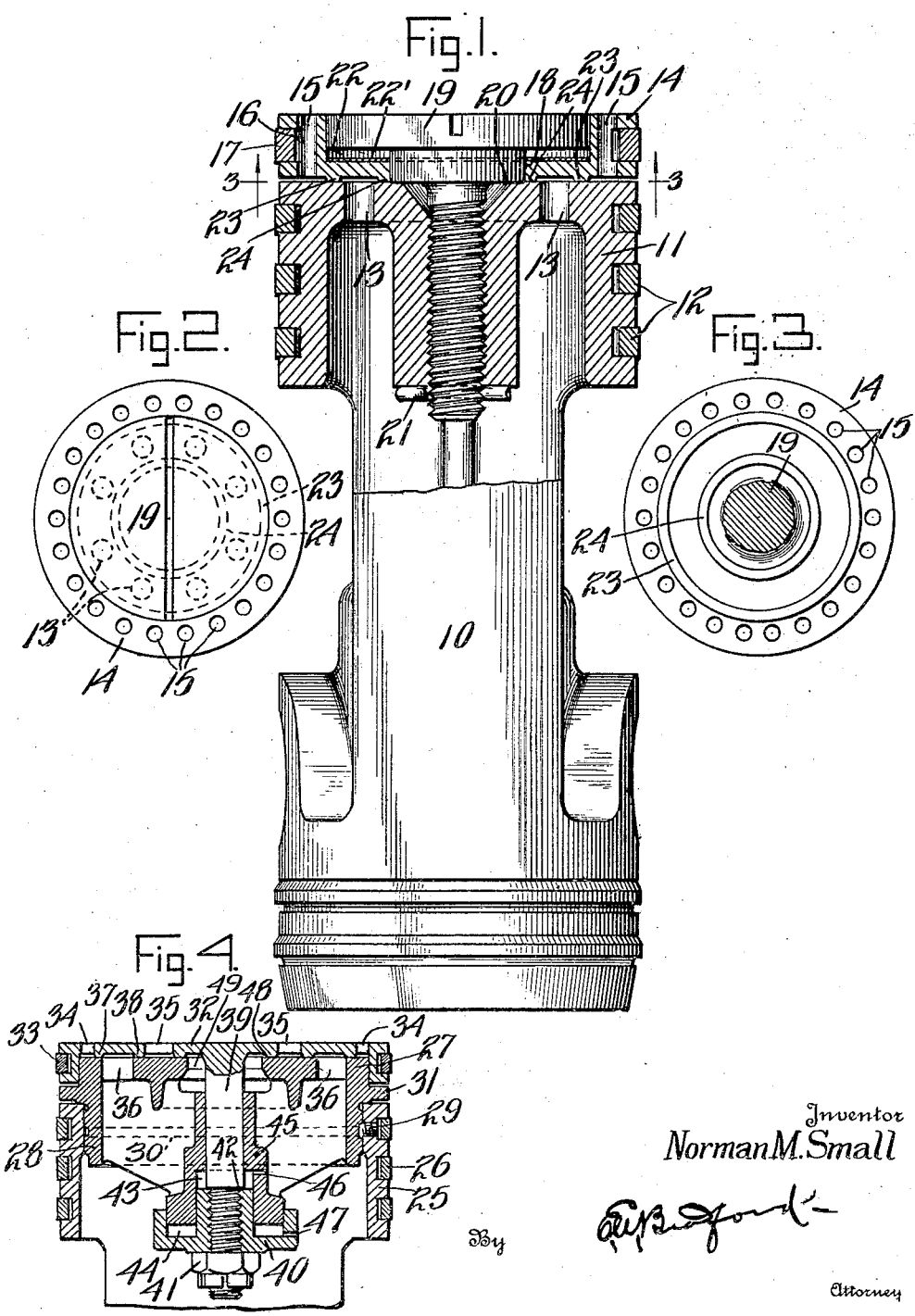

Patented May 5, 1931

1,804,065

UNITED STATES PATENT OFFICE

NORMAN M. SMALL, OF WAYNESBORO, PENNSYLVANIA, ASSIGNOR TO FRICK COMPANY, OF WAYNESBORO, PENNSYLVANIA, A CORPORATION OF PENNSYLVANIA

VALVE

Application filed June 21, 1928. Serial No. 287,284.

My invention relates to valves for pistons and is particularly designed with a view to its use in compressors for use with refrigerating machines.

Among the objects of the invention is to provide a valve which shall be noiseless in operation, easily removable from the piston, and which shall provide security against fluid leakage.

Referring to the accompanying drawings which are made a part hereof and on which similar reference characters indicate similar parts, Figure 1 shows a sectional elevation of a piston showing my improved valve, Figure 2, an end view of the piston, Figure 3, a section on line 3—3 of Figure 1, and Figure 4, a sectional view of a modified form of valve.

In the drawings numeral 10 indicates a well known piston having a head 11 and packing rings 12. The end of the piston is provided with axial ports 13 for the passage of fluid through the piston. The valve comprises a disc or plate 14 having a series of ports 15 therearound. The plate has a groove 16 around its periphery in which is placed a packing ring 17. The plate has also a large central opening 18 for the reception of a large headed screw 19 by means of which the plate is held upon the head of the piston. The screw 19 has a shoulder 20 which engages with the end of the piston. The member 19 is screw threaded through the end of the piston head 11 and has a cotter pin 21 passing through the end to prevent displacement of the screw. A clearance at 22 provides for axial movement of the valve plate or disc 14 during operation of the compressor. A plurality of shims 22' are placed in the bottom of the space 22 to vary the extent of movement of the valve. The under side of the valve is provided with circular depending ridges 23 and 24 which engage the end surface of the piston head 11. These ridges surround the circular series of perforations 13 in the end of the piston head 11.

In operation, upon a suction stroke, the packing ring 17, frictionally engaging the inner surface of the cylinder, lifts the valve plate 14 from the head of the piston. Fluid enters through the center of the piston head and passes out through the perforations 13 beneath the annular shoulders 23 and out through the perforations 15 in the valve disc.

Upon the compression stroke, the valve is moved to its seat so that the ridges 23 engage the end of the piston and provide fluid tight engagement to force the fluid out of the pump chamber in a well known manner.

In the form of the invention shown in Figure 4, the piston head is made separable. In this form the head 25 is provided as above with packing rings 26. A separable member 27 has a cylindrical portion 28 which fits within the piston head 25 and is secured therein by means of set screws 29 adapted to engage an annular groove 30 around the circular portion 28. A flange 31 on the member 28 engages the outer end of the piston head 25. The valve comprises a plate or disc 32 having a packing ring 33 seated in a groove in its periphery. This valve is provided with an annular series of perforations 34 and 35. The head 28 is provided also with a series of axial annular ports 36 and 49. Depending annular ridges 37, 38 and 48 provide a seat for the valve on each side of the annular ports 36 and around the port 49 in the piston head. The valve plate has a stem 39 which is screw threaded into a cap 40. The outer end of the stem 39 has secured thereon a nut 41 which holds the cap against a shoulder 42 on the stem 39. Clearance chambers 43 and 44 are provided between the cap 40 and a central portion 45 of the cap plate 28. The chambers 43 and 44 communicate with the fluid through perforations 46 and 47 respectively. These chambers, through the restricted outlets, provide for cushioning the movement of the valve disc 32. The operation of this form of the invention is the same as that described with respect to the above forms in that fluid enters through perforations 36 and 49 in the piston head, passes beneath the annular ridges 37, 38 and 48, and out through the perforations 34 and 35 in the valve. The movement of the valve is limited to the depth of the chambers 43 and 44, and the movement of the valve is also somewhat retarded by the cushioning effect of the fluid in the chambers 43 and 44.

The result of the cushioning effect is the elimination of noise and is particularly advantageous for large compressor units.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A valved piston comprising a piston head having a series of axial perforations therein, a valve having a series of axial perforations arranged in a circle of larger diameter than the perforations in the piston head, an annular depending ridge on said valve between the perforations in the valve and those in the piston head, and means for securing the valve upon the piston to allow a slight axial movement of the valve with respect to the piston, substantially as set forth.

2. A valved piston comprising a ported piston head, a valve disc having ports therethrough, a depending annular ridge on the piston plate between the ports in the plate and the ports in the piston head, a screw having a large head secured in the piston head and placed so as to provide a clearance between the head of the screw and the body of the valve whereby the valve is allowed a slight axial movement with respect to the piston head, substantially as set forth.

3. A valved piston comprising a piston head having an annular series of ports extending axially therethrough, a valve having a series of annular ports extending axially therethrough, a ridge on said valve adapted to provide a seat between the annular ports in the valve and the piston head, a packing ring secured in a groove about the periphery of said valve plate, means for securing said valve to said piston head so as to provide a clearance to allow an axial movement of said valve with respect to said piston head during operation, substantially as set forth.

In witness whereof, I have hereunto set my hand and seal at Waynesboro, Pennsylvania, this 14th day of June, A. D. nineteen hundred and twenty-eight.

NORMAN M. SMALL.